United States Patent [19]
Montes

[11] Patent Number: 5,888,280
[45] Date of Patent: Mar. 30, 1999

[54] PROTECTIVE COATING COMPOSITION WITH EARLY WATER RESISTANCE

[75] Inventor: Ernesto Montes, Moreno Valley, Calif.

[73] Assignee: Ameron International Corporation, Pasadena, Calif.

[21] Appl. No.: 877,793

[22] Filed: Jun. 18, 1997

[51] Int. Cl.$^6$ ........................................... C07D 5/10
[52] U.S. Cl. ................ 106/14.21; 106/2; 106/286.6; 106/286.7; 106/287.1; 106/287.34; 106/623
[58] Field of Search .................. 106/14.21, 623, 106/286.6, 286.7, 287.1, 287.34, 2

[56] References Cited

U.S. PATENT DOCUMENTS

| | | | |
|---|---|---|---|
| 2,923,643 | 2/1960 | Rodwell | 117/70 |
| 3,455,709 | 7/1969 | Sears, Jr. | 106/623 |
| 3,620,784 | 11/1971 | Schutt | 106/623 |
| 3,721,574 | 3/1973 | Schnieder et al. | 106/623 |
| 4,026,710 | 5/1977 | Kennedy | 106/1.17 |
| 4,097,287 | 6/1978 | Ito et al. | 106/14.14 |
| 4,098,720 | 7/1978 | Hwa | 252/389 |
| 4,381,334 | 4/1983 | Balk et al. | 428/332 |
| 4,740,389 | 4/1988 | Barton et al. | 427/207.1 |
| 4,888,056 | 12/1989 | Van Der Kolk et al. | 106/287.1 |
| 4,935,058 | 6/1990 | Helmstetter | 106/14.11 |
| 5,131,948 | 7/1992 | Higashiyama et al. | 106/14.14 |
| 5,393,567 | 2/1995 | Wekenmann et al. | 427/372.2 |
| 5,413,628 | 5/1995 | Savin | 106/14.44 |
| 5,545,253 | 8/1996 | Edelmann et al. | 106/287.16 |
| 5,580,907 | 12/1996 | Savin | 523/219 |

FOREIGN PATENT DOCUMENTS

| | | | |
|---|---|---|---|
| 51-102025 | 9/1976 | Japan | 106/623 |
| 52-004534 | 1/1977 | Japan | 106/623 |
| 59-051951 | 3/1984 | Japan | 106/623 |
| 62-198457 | 9/1987 | Japan | 106/623 |
| 62-227968 | 10/1987 | Japan | 106/623 |
| 298623 | 3/1971 | U.S.S.R. | 106/623 |

OTHER PUBLICATIONS

WPIDS Abstract No. 79–54866B, abstract of German Patent Specification No. 2,901,395, Jul. 1979.
WPIDS Abstract No. 82–06819E, abstract of Japanese Patent Specification No. 56–161477, Dec. 1981.

*Primary Examiner*—Anthony Green
*Attorney, Agent, or Firm*—Christie, Parker & Hale, LLP

[57] ABSTRACT

A protective coating composition with early water resistance is prepared, according to principles of this invention, by combining in the presence of water and in their proper proportions: (1) zinc dust; (2) a Group IA metal silicate; (3) a colloidal silica ingredient that is modified with a Group IA metal silicate; and (4) a carbonate-containing internal hardener. Optional ingredients such as a stabilizing agent, external hardener, pigments and fillers, and other additives can be used to achieve certain coating properties depending on the final intended coating application. The Group IA metal silicate and colloidal silica ingredient that is modified with a Group IA metal silicate react, in the presence of the other ingredients, to form a silicate network having early water resistance, i.e., water insolubility, improved high-temperature resistance, improved corrosion resistance, and zero volatile organic content. Coating compositions prepared according to principles of this invention are formulated to cure at ambient temperature to form a water insoluble protective coating, for use in such applications as a full primer or preconstruction primer, within three hours.

26 Claims, No Drawings

PROTECTIVE COATING COMPOSITION WITH EARLY WATER RESISTANCE

FIELD OF THE INVENTION

This invention relates to a coating composition useful for forming a protective coating on steel substrates and, more specifically, to zinc-rich water-based protective coating compositions having properties of improved corrosion resistance, hardness, high-temperature resistance, and early water resistance when compared to conventional organic solvent- and water-based coating compositions.

BACKGROUND

Inorganic coating compositions formulated using metallic zinc are known to be used as protective coatings on steel substrates to prevent corrosion from forming under different environments. The galvanic protection offered by the metallic zinc has made such coating compositions one of the few that offer good corrosion protection to steel substrates that are used in a marine atmospheric environment. Such coating compositions are formulated to use either a water-based binders or an organic solvent-based binder.

Such coating compositions are known to be used as both preconstruction and full-thickness primers. The main requirements for a preconstruction primer is that it be both weldable and cuttable. A primer is cuttable if it does not reduce the speed at which the primered substrate is cut to a point where the cutting operation becomes uneconomical. A primer is weldable if it allows the primered substrate to be welded without producing a large amount of "blow holes" in the welds, or without causing a large increase in the porosity of the welds. Such blow holes in or increased porosity of the welds is caused by the exposure of the primer to localized high temperatures during welding, causing the primer to vaporize. The creation and presence of such blow holes and increased porosity is not desired because each can result in the failure of the weld, which can result in a structural failure of the welded substrate.

Protective coatings formed from conventional metallic zinc-containing inorganic coating compositions are known to cause blow holes in welds and/or increases in the porosity of welds when exposed to localized high temperature during the welding operation. Such blow holes and increased porosity formed in the welds is caused from the limited ability or complete inability of the coating to recombine itself into a high-melting point product and maintain its integrity when exposed to high temperatures.

Additionally, protective coating formed from water-based metallic zinc inorganic coating compositions are known to use water-soluble binders such as sodium, potassium or lithium silicates. The use of such water-soluble binders is known to produce coating compositions that normally require a considerable amount of time to become water insoluble and, thus provide an effective corrosion barrier in marine atmosphere environments or other high-humidity conditions.

In view of the increasing interest in the environment, it is also becoming increasingly more desirable that coating compositions useful for forming protective coatings have a low or preferably zero volatile organic content and, therefore, be formulated with a water-based binder system.

It is, therefore, desirable to develop a coating composition useful for forming a protective coating for steel substrates that has improved high-temperature resistance, and is capable of retaining its corrosion resistance after exposure to high-temperature conditions of above 750° F. It is desirable that such coating composition also be developed to provide an improved degree of water insolubility and water resistance within a short time after being applied, i.e., provide early water resistance. It is also desired that such coating composition have zero volatile organic content, thereby making its use economically desirable and practical. It is further desirable that such coating composition be formulated so that it be versatile, permitting its use as either a preconstruction or full-thickness primer.

SUMMARY OF THE INVENTION

Protective coating compositions with early water resistance are prepared, according to principles of this invention, by combining in the presence of water and in proper proportions: (1) zinc dust; (2) a Group IA metal silicate; (3) a colloidal silica ingredient that is modified with a Group IA metal silicate; and (4) a carbonate-containing internal hardener. Optional ingredients such as a stabilizing agent, external hardener, pigments and fillers, and other additives can be used to achieve certain coating properties depending on the final intended coating application.

The Group IA metal silicate and colloidal silica ingredient that is modified with a Group IA metal silicate react, in the presence of the other ingredients, to form a silicate network having early water resistance, i.e., water insolubility, improved high-temperature resistance, improved corrosion resistance, and zero volatile organic content. Coating compositions prepared according to principles of this invention are formulated to cure at ambient temperature to form a water insoluble protective coating, for use in such applications as a full primer or preconstruction primer, within three hours.

DETAILED DESCRIPTION

Protective coating compositions, prepared according to principles of this invention, are formulated by combining: (1) a metallic zinc dust; (2) a water-based binder comprising a Group IA metal silicate and a colloidal silica ingredient that is modified with a Group IA metal silicate; (3) an optional nucleating agent comprising a Group IVB oxide; (4) an internal hardener; (5) an optional external hardener; and (6) an optional stabilizer. If desired, pigments, fillers, and additives can optionally be added depending on the particular coating application.

With respect to the water-based binder, a desired binder is prepared by combing a Group IA metal silicate with a colloidal silica ingredient that is modified with a Group IA metal silicate. A preferred Group IA metal silicate is potassium silicate because it serves as a fluxing compound, when the coated substrate is being welded, that aids in allowing a steady hot arc to be generated at a lower voltage than otherwise achievable by using sodium silicate, which tends to sputter and/or extinguish the arc. This permits a higher tensile strength weld to be obtained during the welding process, thereby reducing the amount of elongation of the welded metal. A preferred potassium silicate ingredient has a $SiO_2$ to $K_2O$ mole ratio in the range of from about 3.5 up to about 4.5. It is desired that the Group IA metal silicate have an $SiO_2$ to alkali oxide mole ratio of less than about 4.5 to ensure that the viscosity of the Group IA metal silicate remain low enough to permit mixing and application of the final composition by conventional application methods.

A particularly preferred potassium silicate ingredient is one manufactured by Zalcon, Inc., of Cleveland, Ohio under the product name Zacsil Glass, Grade 30. Such a preferred potassium silicate ingredient has a $SiO_2$ weight percent of approximately 20, a $K_2O$ weight percent of approximately eight, and has a mole ratio of $SiO_2$ to $K_2O$ of approximately four.

A preferred colloidal silica ingredient that is modified with a Group IA metal silicate is one modified with lithium silicate. Lithium silicate is preferred because it is effective in incorporating a large amount of silica into the colloidal silica at a very low viscosity. It is desired that the lithium silicate have an $SiO_2$ to alkali oxide mole ratio in the range of from about 4.5 to 6. A particularity preferred colloidal silica ingredient that is modified with lithium silicate is lithium polysilicate manufactured by DuPont of Wilmington, Del. available under the product name Polysilicate 48. Such a preferred lithium polysilicate has a $SiO_2$ weight percent of approximately 20, a $Li_2O$ weight percent of approximately two, and has a mole ratio of $SiO_2$ to $Li_2O$ of approximately 5.

The potassium silicate and colloidal silica ingredient that is modified with lithium silicate are combined to produce a blend having a total $SiO_2$ to $K_2O$ mole ratio in the range of from about 3.5 up to about 5.7, and more preferably in the range of from about 4 to 4.5. A binder blend having a total $SiO_2$ to $K_2O$ mole ratio in this range is desirable because it economically promotes early insolubilization of the composition when used in conjunction with internal and external hardeners. A binder blend having a total $SiO_2$ to $K_2O$ mole ratio of less than about 3.5 may produce a final coating that is unable to promote water insolubility within a desired time frame. A binder blend having a total $SiO_2$ to $K_2O$ mole ratio of greater than about 4.5 may produce a final coating that contains more $SiO_2$ than is economically desirable to achieve a desired degree of early water insolubility. In a preferred embodiment, the binder blend has a total $SiO_2$ to $K_2O$ mole ratio of approximately 4.3.

It is desired that protective coating compositions of this invention be prepared by using in the range of from about 10 to 50 percent by weight of the Group IA metal silicate, e.g., potassium silicate, depending on the intended final application. For example, when preparing a protective coating composition for use as a full primer it is generally desirable to use less of the Group IA metal silicate than an amount that would be used for forming a preconstruction primer. Using less than about 10 percent by weight of the Group IA metal silicate can produce a coating composition having poor adhesive strength. Using more than about 50 percent by weight of the Group IA metal silicate may produce a coating composition having a viscosity that is higher than desired to provide a thin-film coating in certain applications, e.g., as a preconstruction primer. In a particularly preferred embodiment, approximately 18 percent by weight of the Group IA metal silicate is used.

It is desired that protective coating compositions of this invention be prepared by using in the range of from about 0.5 to 15 percent by weight of the colloidal silica ingredient that is modified with a Group IA metal silicate, e.g., lithium silicate, depending on the intended final application. For example, when preparing coating composition of this invention for use as a full primer it is generally desirable to use less of the colloidal silica ingredient that is modified with a Group IA metal silicate than an amount that would be used for forming a preconstruction primer. Using less than about 0.5 percent by weight of the colloidal silica ingredient that is modified with a Group IA metal silicate may produce a coating composition having a silica to alkali mole ratio that is too low to provide a desired degree of insolubilization. Using more than about 15 percent by weight of the colloidal silica ingredient that is modified with a Group IA metal silicate is not economically desirable. In a particularly preferred embodiment, approximately two percent by weight of the colloidal silica ingredient that is modified with a Group IA metal silicate is used.

With respect to the nucleating agent, a desired nucleating agent is one selected from the group of Group IVB metal oxides and Group IVB metal oxide-containing compounds. Preferred Group IVB metal oxides include $TiO_2$ and $ZrO_2$ because of the excellent nucleating effects that such compounds provide to the silicate blend when used in small amounts. It is theorized that when used in small amounts, the $ZrO_2$ can get into the silicate structure and form a quantity of zirconium silicate compound.

A preferred Group IVB metal oxide nucleating agent is $ZrO_2$ because of its relatively high bond strength (greater than about 80 Kcal/mol) and its relatively high coordination number (six), thereby allowing $ZrO_2$ to act as an excellent nucleating agent to form a three dimensional network with co-valent bonding. Additionally, $ZrO_2$ is desired because of its resistance to corrosion at elevated temperatures, and because of its contribution to the formation of a bi-metallic compound of zirconium and zinc when the zinc is added to the composition. Such a bi-metallic compound of zirconium and zinc is desired because it has a melting point that is higher than that of zinc alone, thereby minimizing high-temperature coating damage and facilitating the welding process of substrates coated with such protective coating.

It is desired that protective coating compositions of this invention be prepared by using up to about five percent by weight of the nucleating agent. It is to be understood that the use of the nucleating agent is optional and depends on the particular coating composition application. For example, using the nucleating agent is desired in applications where enhanced film-forming characteristics are desired. Using greater than about five percent by weight of the nucleating agent is more than is needed to produce the desired film-forming effect and, thus is not economically desired.

With respect to the internal hardener, it is desired that the internal hardener be selected from the group of carbonates and, more specifically, Group IA and IIA metal carbonates and Group IA and IIA metal carbonate-containing compounds. Carbonates are desired internal hardeners because of their ability to release $CO_2$ in the liquid, which provides a hardening effect by neutralizing some of the alkali to make the silicate less soluble. When the composition is applied, and after water evaporation, the release of $CO_2$ by the internal hardener allows for a silicate network to be formed by bridging oxygen ions. The cross-linked network with bridging oxygen ions can be weakened by the alkali, which can cause the oxygen ions to shed an electron. Such electron shedding increases the solubility of the silicate network and reduces its hardness. Neutralizing the alkali helps to minimize such electron shedding, thereby increases the insolubility of the network and increases its hardness.

A preferred internal hardener is potassium zirconium carbonate because of its ability to freely release $CO_2$ into the liquid and act as an internal hardener. A particularly preferred potassium zirconium carbonate is one manufactured by Magnesium Elektron, Inc., under the product name Zirgel K. It is desired that protective coating compositions of this invention be prepared by using in the range of from about 0.01 to 1 percent by weight of the internal hardener. Using less than about 0.01 percent by weight of the internal hardener is not desired because less than a desired amount of $CO_2$ will be released to produce a desired internally hardening effect. Using more than about one percent by weight of the internal hardener is not desired because it will accelerate the cure process for the composition, thereby reducing its pot life. In a particularly preferred embodiment, approximately 0.06 percent by weight of the internal hardener is used.

It is to be understood that protective coating compositions of this invention can be prepared by using a single ingredient that is capable of acting as both an nucleating agent and an internal hardener. An example of such a single ingredient is one a compound that either contains both a Group IVB metal oxide and a carbonate, or contains the ingredients necessary to form a Group IVB metal oxide and a carbonate upon its combination with the remaining ingredients. An example of such material is the compound Zirgel K, having the chemical formula $K_2Zr(OH)_3(CO_3)_{1.5}$. When used to prepare protective coating compositions of this invention, the Zirgel K compound forms $ZrO_2$ that acts as a nucleating agent, and release carbonate that acts as an internal hardener.

With respect to the external hardener, a desired external hardener is selected from the group consisting of aluminum-containing compounds. Aluminum-containing compounds are favored as external hardeners because it is believed that the aluminum acts to repair whatever damage the alkali may cause to the silicate network. A preferred aluminum compound is $Al(OH)_3$ that is manufactured by Solem Industries, a Division of J. M. Huber, under the product name alumina trihydrate.

It is desired that protective coating compositions of this invention be prepared by using up to about five percent by weight of the external hardener. It is to be understood that use of the external hardener is optional. Using more than about five percent by weight of the external hardener can produce a final composition that has an accelerated cure time, thereby reducing its pot life. In a particularly preferred embodiment, approximately one percent by weight of the external hardener is used.

With respect to the optional stabilizer ingredient, it is desired that the stabilizer ingredient be selected from the group of calcium-containing compounds. Calcium-compounds are desired stabilizers because they have shown to decrease solubility of the Group IA metal silicate, thereby reducing the amount of time that it takes the final composition to become insoluble and display early water resistance. A preferred calcium-containing stabilizer ingredient is calcium silicate manufactured by NYCO of Wilsboro, N.Y. under the product name NYAD. Calcium silicate is also preferred because of its reinforcing effects on the powder mixture, due to the acicular form of the calcium silicate particles themselves.

It is desired that protective coating compositions of this invention be prepared by using up to about five percent by weight of the stabilizer. Use of the stabilizer ingredient is desired for applications of the coating composition where it is used as a full primer, and may not be desired for applications where the coating composition is used as a preconstruction primer. Using more than about five percent by weight of the stabilizer may produce a composition having a fast settling time, making handling and application of the composition difficult. In a particularly preferred embodiment, approximately two percent by weight of the stabilizer ingredient is used.

With respect to the zinc dust, it is desired a that a metallic zinc dust having an average particle size in the range of from about two to ten micrometers be used. For example, for preconstruction primer compositions, it is desired that the particle size be in the range of from about two to five micrometers, and for full primer applications it is desired that the particle size be in the range of from about five to ten micrometers. A preferred metallic zinc dust has a particle size in the range of from about four to six micrometers. The zinc dust is used to provide corrosion resistance to the composition.

It is desired that protective coating compositions of this invention be prepared by using in the range of from about 20 to 96 percent by weight of the zinc dust. The amount of zinc dust that is used depends on the final application for the coating composition. For example, when used as a full primer it is generally desirable to use a larger amount of the zinc dust that what would be used to prepare a coating composition used as a preconstruction primer. Using less than about 20 percent by weight of the zinc dust may not provide a coating composition having a desired degree of corrosion protection. Using more than about 90 percent by weight of the zinc dust may be more than is needed to provide a sufficient degree of corrosion protection, thus would be economically undesirable. In a particularly preferred embodiment, useful as a full primer, approximately 70 percent by weight of the zinc dust is used. In a particularly preferred embodiment, useful as a preconstruction primer, approximately 27 percent by weight of the zinc dust is used.

In addition to those ingredients already described, pigments and fillers can also be used depending on the particular protective coating applications. Suitable pigments and fillers may be selected from organic and inorganic color pigments which may include titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment and filler that is used to form the composition is understood to vary, depending on the particular composition application, and can be zero when a clear composition is desired. If desired, protective coating compositions of this invention can be prepared by using up to about 10 percent by weight of the combined pigments and fillers.

Additionally, protective coating compositions of the present invention may also contain additives such as rheological modifiers, plasticizers, antifoam agents, thixotropic agents, pigment wetting agents, bituminous and asphaltic extenders, solvents, antisettling agents, diluents, UV light stabilizers, air release agents, dispersing aids and the like to achieve the desired properties sought by the user. If desired, protective coating compositions of this invention can be prepared by using up to about five percent by weight of such additives.

Water is an important ingredient of the present invention and is used as the solvent to form an aqueous coating composition having a zero volatile organic compound content, i.e., free of any volatile organic solvent. It is desired that protective coating compositions of this invention be prepared by using in the range of from about 2 to 25 percent by weight added distilled water, depending on the desired final coating composition application. Generally speaking, is desired that a greater amount of added water be used when preparing a coating composition that will be used as a preconstruction primer than one that will be used as a full primer. Using less than about two percent by weight water may produce a composition that has a viscosity that may be too high to permit application by conventional method, e.g., spray application. Using more than about 25 percent by weight water may produce a composition having a binder that is diluted to the point that is causes the cohesive strength of the film to be weakened. In a particularly preferred embodiment, approximately seven percent by weight water is used. It is to be understood that the amount of water set forth above is in the form of added water, and that the total water content of the composition may be greater than that of the added water due to the presence of water in any one of the other liquid ingredients.

Protective coating compositions are prepared, according to principles of this invention, as a two-component system by first combining ingredients in a powder form to form a powdered mixture (the first component), combining ingredients in a liquid form to form a liquid mixture (the second component), and then combining the powdered mixture and liquid mixture together. The powdered mixture is formed by combining the zinc dust with the stabilizer, any external hardener, and any filler. The powdered mixture is then blended together by conventional means to obtain a homogeneous mixture.

The liquid mixture is formed by combining the Group IA metal silicate with the colloidal silica ingredient that is modified with a Group IA metal silicate, any nucleating agent, the internal hardener, water, any pigment, and any additives. It has been discovered that increased stability can be obtained by heating the internal hardener (e.g., potassium zirconium carbonate) in a distilled water solution before incorporation of the Group IA metal silicate (e.g., potassium silicate), and the colloidal silica ingredient that is modified with Group IA metal silicate (e.g., colloidal silica modified with lithium silicate). The liquid mixture is blended together by conventional means to obtain a homogeneous mixture.

Heating the internal hardener at a temperature in the range of from about 140° to 180° F. for a period of about one hour is sufficient to effect generation of $CO_2$ from the internal hardener, thereby increasing the stability of thereafter formed coating composition so that it remains stable for a period of more than one month at a temperature of 120° F. It has been discovered that a compromise exists between extended stability and internal hardening by the $CO_2$, which can be controlled by the heating conditions. Generally, the higher the heating temperature the longer the stability and the longer the hardening time, and the lower the heating temperature the shorter the stability and the earlier the hardening time.

A powdered mixture is prepared by combining zinc dust, any stabilizer agent, any external hardener, and any pigments and fillers. The powdered and liquid mixtures are combined together with agitation by conventional means to form the final protective coating composition. Protective coating compositions of this invention are developed for application by conventional methods such as by brush, roller, or standard air and airless spray equipment, without the use of organic solvents.

A feature of protective coating compositions of this invention is that they exhibit excellent water resistance, or water insolubility, and film hardness a short time after application and curing at room temperature, i.e., early water resistance. Such early water resistance is attributed to the use of the internal hardener and the stabilizer. Generally, protective coating compositions of this invention have been shown to have three times the water resistance of conventional water-based zinc protective coatings in less time.

Another feature of protective coating compositions of this invention is that they are water based and do not include organic solvents, thus have a zero volatile organic compound content. A still other feature is that protective coating compositions of this invention have improved high temperature resistance above about 750° F., while maintaining excellent chemical and corrosion resistance to the underlying steel substrate, when compared to conventional organic- and water-based protective coating compositions.

Protective coatings of this invention can be formulated for use in different types of applications such as full primers and pre-construction primers. Examples of protective coating compositions prepared according to principles of this invention are provided below. It is to be understood that such examples are not intended to be limiting but only illustrative of how coating compositions of this invention can be prepared.

EXAMPLE NO. 1

Preparation of protective coating composition for use as a full primer

A liquid mixture was prepared by combining the following liquid ingredients in the following approximate proportions: Group IA metal silicate (Zacsil Glass)-18 percent by weight (pbw); colloidal silica modified with Group IA metal silicate (Polysilicate 48)-2 pbw; combined internal hardener and nucleating agent (Zirgel K)-0.06 pbw; and distilled water-7 pbw. The internal hardener was heated in a distilled water solution to a temperature of approximately 160° F. for a period of about one hour before incorporation of the Group IA metal silicate and the colloidal silica modified with Group IA metal silicate. The liquid mixture was blended together by conventional means to obtain a homogeneous mixture. A powdered mixture was prepared by combining the following ingredients in the following approximate proportions: zinc dust - 70 pbw; and stabilizer (calcium silicate)-2 pbw. The liquid and powdered mixtures were combined together under agitation by conventional method.

EXAMPLE NO. 2

Preparation of comparison coating composition without stabilizer, internal hardener and nucleating ingredients A comparison water-based zinc protective coating composition was prepared by combining the following ingredients in the following approximate proportions: Group IA metal silicate (Zacsil Glass)-16.5 pbw; colloidal silica modified with Group IA metal silicate (Polysilicate 48)-5 pbw; distilled water-5.5 pbw; potassium hydroxide-0.3 pbw; water-borne colloidal silica-2 pbw; zinc dust-68.5 pbw; and mica-2 pbw. The liquid and powdered ingredients were mixed together by convention method. The comparison protective coating composition differed from protective coating compositions of this invention in that it neither contained the internal hardener nor the stabilizer.

EXAMPLE NO. 3

Preparation of protective coating composition with additional external hardener

A liquid mixture was prepared by combining the following liquid ingredients in the following approximate proportions: Group IA metal silicate (Zacsil Glass)-18 percent by weight (pbw); colloidal silica modified with Group IA metal silicate (Polysilicate 48)-2 pbw; combined internal hardener and nucleating agent (Zirgel K)-0.06 pbw; and distilled water-7 pbw. The internal hardener was heated in a distilled water solution to a temperature of approximately 160° F. for a period of about one hour before incorporation of the Group IA metal silicate and the colloidal silica modified with Group IA metal silicate. The liquid mixture was blended together by conventional means to obtain a homogeneous mixture. A powdered mixture was prepared by combining the following ingredients in the following approximate proportions: zinc dust-70 pbw; stabilizer (calcium silicate)-2 pbw; and external hardener (alumina trihydrate)-1 pbw. The liquid and powdered mixtures were combined together under agitation by conventional method.

EXAMPLE NO. 4

Preparation of protective coating composition for use as a pre-construction primer A liquid mixture was prepared by combining the following liquid ingredients in the following approximate proportions: Group IA metal silicate (Zacsil Glass)-43 percent by weight (pbw); colloidal silica modified with Group IA metal silicate (Polysilicate 48)-10 pbw; combined internal hardener and nucleating agent (Zirgel K)-0.06 pbw; and distilled water-19 pbw. The internal hardener was heated in a distilled water solution to a temperature of approximately 160° F. for a period of about one hour before incorporation of the Group IA metal silicate and the colloidal silica ingredient that is modified with Group IA metal silicate. The liquid mixture was blended together by conventional means to obtain a homogeneous mixture, and zinc duct-27 pbw was added thereto and the liquid and powder mixture was agitated by conventional method.

The Example No. 1 and Example No. 2 protective coating compositions were tested for water insolubility by applying the coating to a surface of a steel substrate, curing the coating at room temperature (approximately 72° F.) for various periods of time, and then immersing the coated substrate in water for a period of approximately one hour. After one hour the coated substrate was removed from the water and the coated surface was double rubbed with a wet cloth until discoloration of the cloth was detected.

Under such test conditions, the Example No. 1 protective coating composition, prepared according to principles of this invention, was cured for a period of three hours and was found to display cloth discoloration after approximately 200 double rubs. By comparison, under such test conditions the Example No. 2 protective coating composition was cured for a period of four hours at room temperature and cloth discoloration was detected after approximately 70 double rubs. Based on these results, the water insolubility test demonstrated that protective coating compositions of this invention have superior early water resistance when compared to that of the comparative protective coating composition lacking the internal hardener, providing approximately three times the water resistance in only ¾ of the cure time.

Although protective coating compositions of the present invention have been described with considerable detail with reference to certain preferred variations thereof, other variations are possible. Therefore, the spirit and scope of the appended claims should not be limited to the preferred variations described herein.

What is claimed is:

1. A water-based protective coating composition prepared by combining:

zinc dust;

a first Group IA metal silicate;

a colloidal silica compound modified with a second group IA metal silicate having a $SiO_2$ to alkali metal oxide mole ratio that is greater than the first Group IA metal silicate a carbonate-containing compound for releasing $CO_2$ into the composition to facilitate forming a silicate network; and water.

2. The water-based protective coating composition as recited in claim 1 wherein the carbonate-containing compound is selected from the group consisting of Group IA metal carbonates, Group IIA metal carbonates, Group IA metal carbonate-containing compounds, Group IIA metal carbonate-containing compounds, zirconium carbonate compounds, and mixtures thereof.

3. The water-based protective coating composition as recited in claim 2 wherein the carbonate-containing compound is present in the range of from about 0.01 to 1 percent by weight of the total weight of the composition.

4. The water-based protective coating composition as recited in claim 1 further comprising an aluminum hydroxide compound to contribute to the formation of a silicate network.

5. The water-based protective coating composition as recited in claim 4 wherein the aluminum hydroxide compound is present up to about five percent by weight of the total composition.

6. The water-based protective coating composition as recited in claim 1 further comprising a calcium-containing silicate for reducing the solubility of the composition.

7. The water-based protective coating composition as recited in claim 1 wherein the Group IA metal silicate is potassium silicate and is present in the range of from about 10 to 50 percent by weight of the total composition.

8. The water-based protective coating composition as recited in claim 1 wherein the colloidal silica compound is a colloidal silica that is modified with lithium silicate and is present in the range of from about 0.5 to 15 percent by weight of the total composition.

9. The water-based protective coating composition as recited in claim 1 comprising a total $SiO_2$ to alkali metal oxide mole ratio in the range of from about 3.5 to 5.7.

10. A water-based protective coating composition prepared by combining:

zinc dust;

a potassium silicate;

a colloidal silica compound that is modified with lithium silicate;

a carbonate-containing compound selected from the group consisting of Group IA metal carbonates, Group IIA metal carbonates, Group IA metal carbonate-containing compounds, Group IIA metal carbonate-containing compounds, zirconium carbonate compounds, and mixtures thereof; and water;

wherein the composition cures at room temperature to form a water insoluble coating within three hours.

11. The water-based protective coating composition as recited in claim 10 comprising a total $SiO_2$ to alkali metal oxide mole ratio in the range of from about 3.5 to 5.7.

12. The water-based protective coating composition as recited in claim 10 wherein the carbonate-containing compound is present in the range of from about 0.01 to 1 percent by weight of the total weight of the composition.

13. The water-based protective coating composition as recited in claim 10 further comprising an aluminum hydroxide compound.

14. The water-based protective coating composition as recited in claim 13 wherein the aluminum hydroxide compound is present up to about five percent by weight of the total composition.

15. The water-based protective coating composition as recited in claim 10 further comprising a calcium-containing silicate that is present up to about five percent by weight of the total composition.

16. The water-based protective coating composition as recited in claim 10 wherein the potassium silicate is present in the range of from about 10 to 50 percent by weight of the total composition, and wherein the colloidal silica compound is present in the range of from about 0.5 to 15 percent by weight of the total composition.

17. A water-based protective coating composition prepared by combining:

zinc dust;

potassium silicate;

colloidal silica compound modified with lithium silicate;

a carbonate-containing compound selected from the group consisting of Group IA metal carbonates, Group IIA metal carbonates, Group IA metal carbonate-containing compounds, Group IIA metal carbonate-containing compounds, zirconium carbonate compounds, and mixtures thereof; and water wherein the composition comprises in the range of from about 20 to 96 percent by weight of the zinc dust, 10 to 50 percent by weight of the potassium silicate, and 0.5 to 15 percent by weight colloidal silicone compound based on the total weight of the composition.

18. The water-based protective coating composition as recited in claim 17 comprising a total $SiO_2$ to alkali metal mole ratio in the range of from about 3.5 to 5.7.

19. The water-based protective coating composition as recited in claim 17 wherein the carbonate-containing compound is present in the range of from about 0.01 to 1 percent by weight of the total weight of the composition.

20. The water-based protective coating composition as recited in claim 17 further comprising an aluminum hydroxide compound.

21. The water-based protective coating composition as recited in claim 20 wherein the aluminum hydroxide compound is present up to about five percent by weight of the total composition.

22. The water-based protective coating composition as recited in claim 17 further comprising a calcium-containing silicate.

23. The water-based protective coating composition as recited in claim 22 wherein the calcium-containing silicate is present in the range of from about 0.5 to 5 percent by weight of the total composition.

24. A water-based protective coating composition prepared by combining:

zinc dust;

a first Group IA metal silicate;

a colloidal silica compound that is modified with a second Group IA metal silicate that is different from the first Group IA metal silicate;

a carbonate-containing compound for releasing $CO_2$ into the composition to facilitate forming a silicate network; and water.

25. The coating composition as recited in claim 24 wherein the first Group IA metal silicate has a $SiO_2$ to alkali metal oxide mole ratio in the range of from about 3.5 to 4.5, and wherein the colloidal silica compound modified with the second Group IA metal silicate has a $SiO_2$ to alkali metal oxide mole ratio in the range of from about 4.5 to 6.

26. The coating composition as recited in claim 25 having a total $SiO_2$ to alkali metal oxide mole ratio in the range of from about 3.5 to 5.7.

* * * * *